US005689146A

United States Patent [19]

Cheever

[11] Patent Number: 5,689,146
[45] Date of Patent: Nov. 18, 1997

[54] CONICAL BEARING SYSTEM FOR SPINDLE MOTORS

[75] Inventor: Charles J. Cheever, Beaverton, Oreg.

[73] Assignee: Synektron Corporation, Portland, Oreg.

[21] Appl. No.: 740,927

[22] Filed: Nov. 5, 1996

[51] Int. Cl.[6] .............. H02K 7/08; H02K 7/14; F16C 32/06; F16C 25/02
[52] U.S. Cl. .............. 310/90; 310/67 R; 384/110; 384/264
[58] Field of Search .............. 310/90, 67 R; 384/110, 264, 247, 271; 29/216, 254, 898.04, 898.07, 898.09

[56] References Cited

U.S. PATENT DOCUMENTS

| | | | |
|---|---|---|---|
| 3,358,352 | 12/1967 | Wilcox | 29/263 |
| 3,984,152 | 10/1976 | Haines | 384/110 |
| 4,448,120 | 5/1984 | Schaule et al. | 310/90 |
| 4,919,547 | 4/1990 | Schwartzman | 384/110 |
| 5,246,294 | 9/1993 | Pan | 384/119 |
| 5,323,076 | 6/1994 | Hajec | 310/90 |
| 5,557,833 | 9/1996 | Pool | 29/261 |

*Primary Examiner*—Clayton E. Laballe
*Attorney, Agent, or Firm*—Chernoff, Vilhauer, McClung & Stenzel

[57] ABSTRACT

A conical bearing system includes a first conical bearing having an integral shaft and a second conical bearing defining a bore having a shaft mating bore section and a threaded bore section. The system is assembled by applying adhesive to the shaft and inserting the shaft into the shaft mating bore section. A threaded screw is then screwed into the threaded bore section until the screw abuts the shaft. Then torque is applied to the screw to push against the shaft thereby causing the second conical bearing to move axially. Once the adhesive has cured, the screw may optionally be removed.

9 Claims, 2 Drawing Sheets

CONICAL BEARING SYSTEM FOR SPINDLE MOTORS

BACKGROUND OF THE INVENTION

The present invention relates to a conical bearing system for use in spindle motors and specifically to a system for setting the bearing clearance of conical bearings in a spindle motor.

Conical or cone-shaped bearings offer several advantages over conventional hydrodynamic fluid film bearings. Traditional hydrodynamic bearings have multiple thrust bearing surfaces that separately support loads in both the radial and axial directions. By using a conical bearing, only one thrust bearing surface is needed to support loads in both the radial and axial directions. Conical bearings offer improved rotodynamic stability. This improvement in rotodynamic spacing is due in part to design and in part to the ability to achieve better bearing spacing.

By eliminating thrust bearing surfaces, the cost associated with manufacturing and grooving the surfaces is reduced. One reason for the decrease in cost is that there are less surfaces. Another reason for the decrease in cost is the use of a simplified grooving design. Whereas the grooving design for conventional hydrodynamic fluid bearing motors is typically a herringbone grooving that requires special equipment and technology to machine, conical bearings generally incorporate inward pumping grooves which can be machined easily using standard multi-axis turning or milling equipment.

The above discussed advantages, as well others known in the art, are often overshadowed by the problems associated with conical bearings assemblies. Of particular concern is the difficulty associated with setting the bearing clearance. For example, it is difficult to set clearances in conical bearings incorporating a split shaft and a split sleeve such as those shown in FIG. 1 and U.S. Pat. No. 5,448,120 to Schaule et al. The clearance in bearing using this type of design is adjusted by pressing the subassemblies together to a determined amount of clearance. However, using this design it is close to impossible to control concentricities and clearances given the tolerances necessary for a fluid bearing because the clearance is most probably determined by the pressure used to press the subassemblies together.

FIG. 2 shows a conical bearing assembly such as the bearing disclosed in U.S. Pat. No. 5,246,294 to Pan. This conical bearing design includes a first conical bearing with an integral shaft that mates with an second insert conical bearing. The first and second conical bearings each have grooves on their outer surfaces that support the conical bearings against an inclined wall portion of the housing. Gaps for fluid are formed between the grooves. It is unclear both whether clearances are set at all and, if they are, how the clearances are set.

What is needed, then, is a conical bearing system in which the clearances can be set easily and precisely.

BRIEF SUMMARY OF THE INVENTION

A conical bearing system of the present invention has clearances that can be set easily and precisely. The system generally includes a first conical bearing having an integral shaft and a second conical bearing defining a bore having a shaft mating bore section and a threaded bore section. The system is assembled by applying adhesive to the shaft and inserting the shaft into the shaft mating bore section. A threaded screw is then screwed into the threaded bore section until the screw abuts the shaft. Then torque is applied to the screw to push against the shaft thereby causing the second conical bearing to move axially. Once the adhesive has cured, the screw may optionally be removed.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
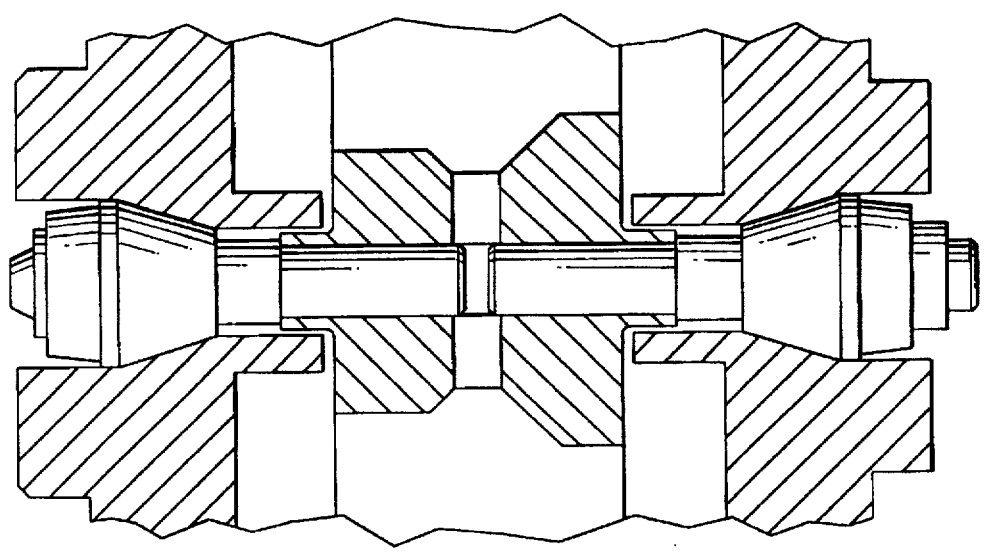
FIG. 1 is a prior art conical bearing.
Figure 2:
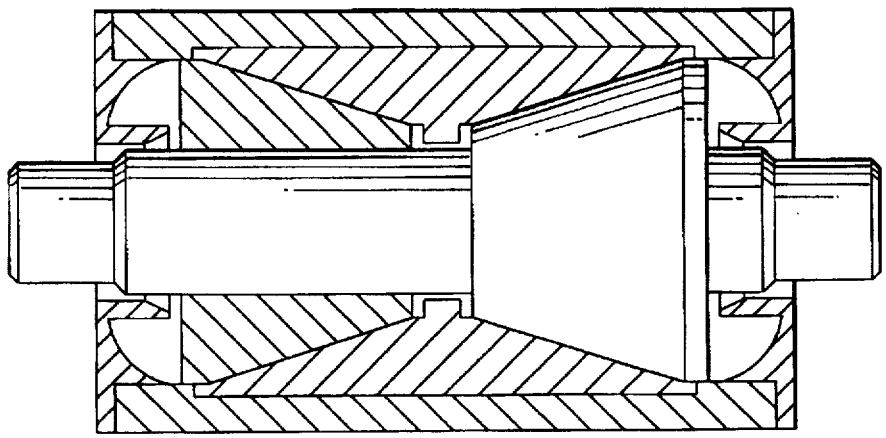
FIG. 2 is a prior art conical bearing.
Figure 3:
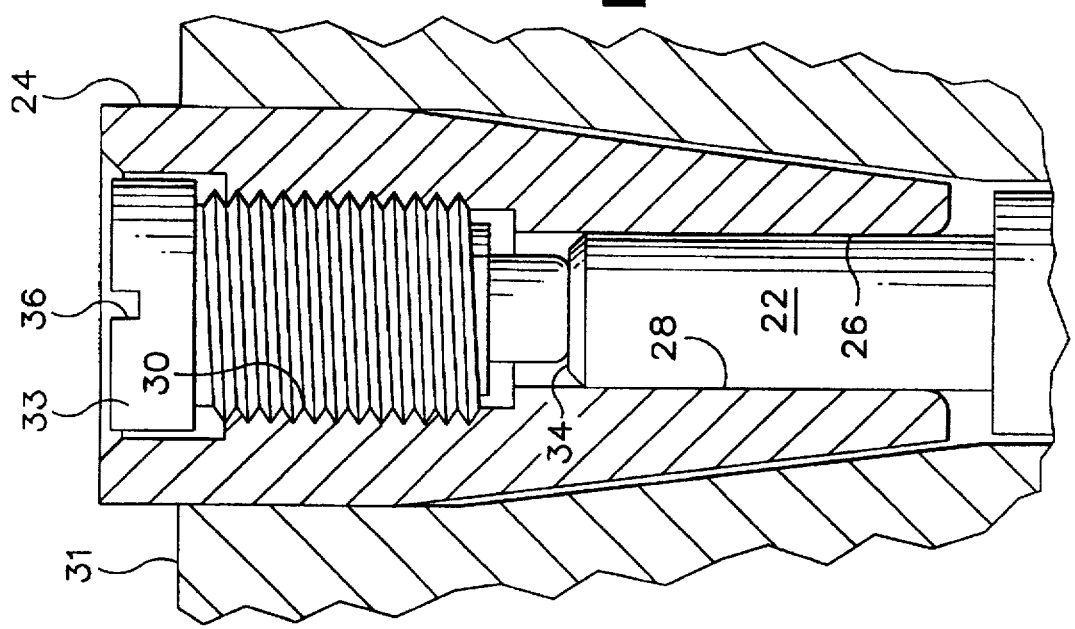
FIG. 3 is a cross-sectional view of a conical bearing of the present invention before the clearance has been set.
Figure 4:
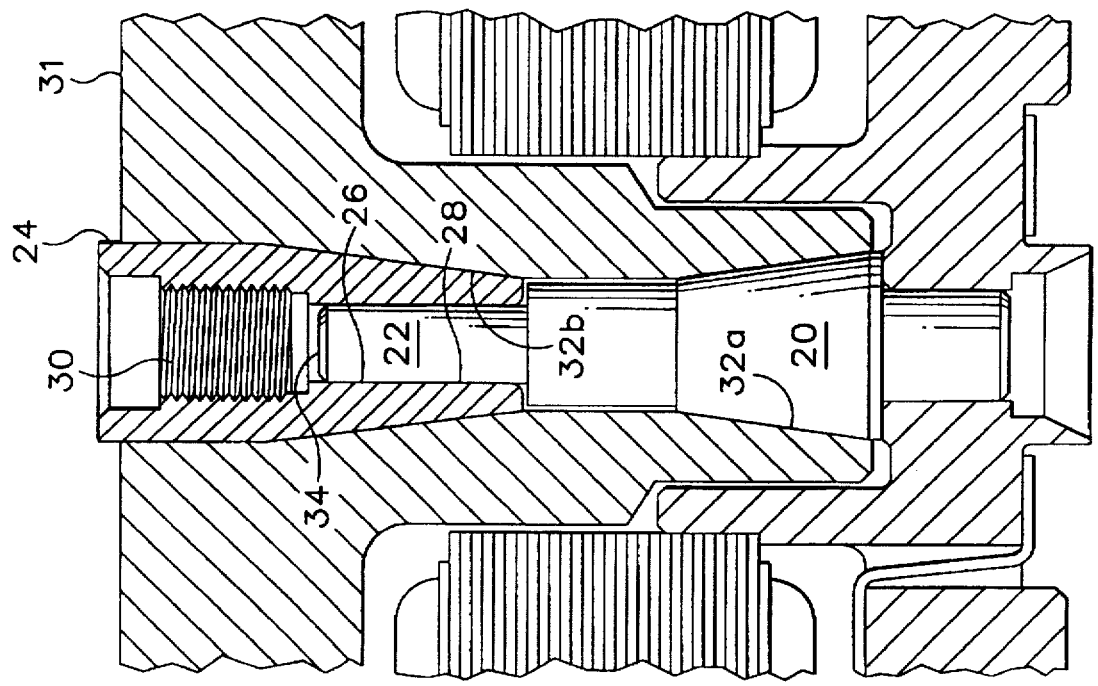
FIG. 4 is an enlarged cross-sectional view of a conical bearing of the present invention after the clearance has been set.

FIGS. 3 and 4 show a conical bearing system of the present invention. The system generally includes a first conical bearing 20 having an integral shaft 22 and a second conical bearing 24 defining a bore 26 having a shaft mating bore section 28 and a threaded bore section 30.

As shown in FIG. 3, the first and second conical bearings 20 and 24 are arranged with their apexes directed toward each other. The conical bearings 20 and 24 are essentially positioned within a bearing sleeve 31 that defines first and second bearing sections 32a and 32b. More specifically, the first conical bearing 20 is inserted into the first bearing section 32a so that the shaft 22 extends at least partially into the second bearing section 32b. The second conical bearing 24 is inserted into the second bearing section 32b and, essentially simultaneously, the shaft 22 is inserted into the shaft mating bore section 28.

The system is assembled by applying adhesive or epoxy (not shown) to the annular side of the shaft 22 at least prior to the shaft being inserted into the shaft mating bore section 28. As shown in FIG. 3, after the shaft 22 has been inserted into the shaft mating bore section 28, the outer surface of the first conical bearing 20 is essentially adjacent to the surface of the first bearing section 32a and the outer surface of the second conical bearing 24 is essentially adjacent to the surface of the second bearing section 32b.

FIG. 4 shows a removable adjustable member, shown as threaded screw 33, that is inserted or screwed into the threaded bore section 30. The threaded screw 33 is first screwed into the threaded bore section 30 until the screw 33 abuts the end 34 of the shaft 33. Then torque is applied to the screw 33 to push against the end 34 of the shaft 22 thereby causing the second conical bearing 24 to move axially away from the first conical bearing 20. FIG. 4 shows the spindle motor after torque has been applied and the second conical bearing 24 has moved axially away from the first conical bearing 20. In this position a bearing clearance is established between the conical bearings 20, 24 and the respective bearing sections 32a, 32b of the bearing sleeve 31.

Because the threaded screw 33 has a fine pitch internal thread, the screw 33 can be adjusted to the proper clearance by applying the necessary torque to the screw 33. For example, as shown in FIG. 4, the threaded screw 33 has a groove 36 into which the head of a screw driver or other such apparatus is inserted. Depending on the pitch of the internal thread, the groove 36 would be turned a specific amount (for example 3.25 turns) which would cause the conical bearings 20, 24 to move apart a predetermined distance. This sets the clearance.

Once the screw 33 has been adjusted so that the clearance is properly set, the adhesive is allowed to cure. Once the adhesive has cured, the screw 33 may optionally be removed.

Experimentation should be used to determine the proper clearance and how far the groove 36 should be turned to set the proper clearance. Also, since the bearing sleeve 31 floats on the bearing system, both the clearance for the first conical bearing 20 and the second conical bearing 24 are set by a single screw 33.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A bearing clearance setting system for conical bearings in spindle motors, said setting system comprising:
   (a) providing a first conical bearing having an integral shaft;
   (b) providing a second conical bearing defining a bore having a first bore section and a second bore section;
   (c) applying adhesive to said shaft;
   (d) inserting said shaft into said first bore section;
   (e) screwing a threaded screw into said second bore section until said screw abuts said shaft;
   (f) applying torque to said screw to push against said shaft thereby causing said second conical bearing to move axially; and
   (g) curing said adhesive.

2. The setting system of claim 1 further comprising removing said screw after curing said adhesive.

3. The setting system of claim 1 further comprising positioning said first and second conical bearings within a housing defining first and second bearing sections.

4. The setting system of claim 3 further comprising positioning first conical bearing within said first bearing section and said second conical bearing within said second bearing section.

5. A method of setting bearing clearance in spindle motors having a housing defining a first bearing section and a second bearing section, a first conical bearing having an integral shaft, and a second conical bearing defining a first bore section, said setting method comprising the steps of:
   (a) providing a second conical bearing further defining a second bore section;
   (b) applying adhesive to said shaft;
   (c) inserting said first conical bearing into said first bearing section of said housing so that said shaft extends into said second bearing section;
   (d) inserting said second conical bearing into said second bearing section of said housing and inserting said shaft into said first bore section;
   (e) screwing a threaded screw into said second bore section until said screw abuts said shaft;
   (f) applying torque to said screw to push against said shaft thereby causing said second conical bearing to move axially; and
   (g) curing said adhesive.

6. The setting system of claim 5 further comprising the step of removing said screw after curing said adhesive.

7. A adjustable clearance spindle motor, comprising:
   (a) a housing defining a first bearing section and a second bearing section;
   (b) a first conical bearing having an integral shaft, said first conical bearing insertable into said first bearing section of said housing so that said shaft extends into said second bearing section;
   (c) a second conical bearing defining a first bore section and a second bore section, said second conical bearing insertable into said second bearing section of said housing so that said shaft mates with first bore section;
   (d) a removable adjustable member insertable into said second bore section, said member engaging said shaft to adjust the axial distance between the first and second conical bearings; and
   (e) adhesive applied to said shaft.

8. The adjustable clearance spindle motor of claim 7 wherein said adhesive is an epoxy.

9. The adjustable clearance spindle motor of claim 7 wherein said removable adjustable member is a threaded screw.

* * * * *